United States Patent
Yoshida et al.

(10) Patent No.: US 6,759,591 B2
(45) Date of Patent: Jul. 6, 2004

(54) SILICON DEVICE

(75) Inventors: Yukihisa Yoshida, Tokyo (JP); Munehito Kumagai, Tokyo (JP); Kazuhiko Tsutsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/343,963

(22) PCT Filed: Jun. 13, 2001

(86) PCT No.: PCT/JP01/04987
§ 371 (c)(1),
(2), (4) Date: Feb. 6, 2003

(87) PCT Pub. No.: WO02/103368
PCT Pub. Date: Dec. 27, 2002

(65) Prior Publication Data
US 2003/0180504 A1 Sep. 25, 2003

(51) Int. Cl.[7] ............................................. H01L 23/02
(52) U.S. Cl. .................................. 174/52.4; 73/514.32
(58) Field of Search ...................... 174/52.4; 73/514.16, 73/514.32, 514.29

(56) References Cited

U.S. PATENT DOCUMENTS

| 5,501,893 A | | 3/1996 | Laermer et al. |
| 5,572,057 A | * | 11/1996 | Yamamoto et al. ......... 257/417 |
| 5,618,989 A | * | 4/1997 | Marek ........................ 73/1.38 |
| 5,760,290 A | * | 6/1998 | Ueyanagi ................... 73/1.39 |
| 6,065,341 A | | 5/2000 | Ishio et al. |
| 6,230,564 B1 | * | 5/2001 | Matsunaga et al. ...... 73/514.01 |

FOREIGN PATENT DOCUMENTS

| JP | 8-321507 | 12/1996 |
| JP | 10-22270 | 1/1998 |
| JP | 11-118826 | 4/1999 |

OTHER PUBLICATIONS

Kobayashi, Shinji et al.; "Double–Frame Silicon Gyroscope Packaged Under Low Pressure by Wafer Bonding", *Transducers '99*, pp. 910–913, (Jun. 7–10, 1999).

Chabloz, M. et al.; "A Method to Evade Microloading Effect in Deep Reactive Ion Etching for Anodically Bonded Glass––Silicon Structures", *Mitsubishi Electric Corporation*.

* cited by examiner

*Primary Examiner*—Hung V. Ngo
(74) *Attorney, Agent, or Firm*—Leydig, Voit & Mayer, Ltd.

(57) ABSTRACT

A silicon device includes an insulating substrate having a recess on the surface of the substrate, and a beam-like structure made of silicon on the front surface of the insulating substrate, surrounds the recess. The beam-like structure includes at least one functional section having a supporting section bonded to the insulating substrate and at least one cantilever integral with the supporting section and extending across the recess. The silicon device also includes a frame made of silicon surrounding and spaced from the beam-like structure and on the insulating substrate. The silicon device also includes a conductive film having electrical continuity with the frame and on the surface of the insulating substrate, at least in a portion directly opposite the cantilever. The conductive film prevents the insulating substrate from being charged, thereby significantly suppressing damage of the beam-like structure during dry etching.

7 Claims, 12 Drawing Sheets

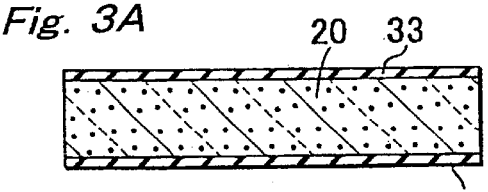
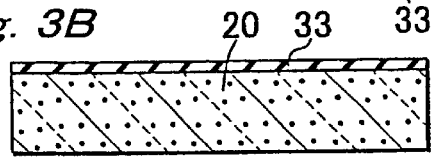
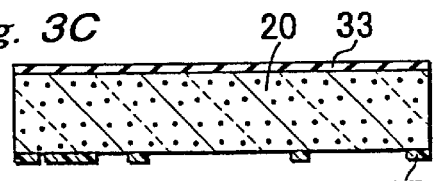
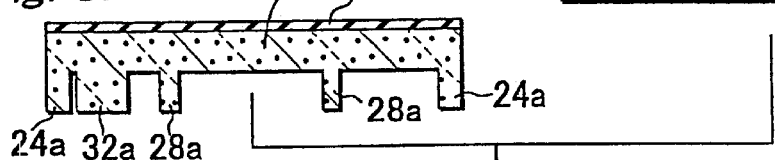
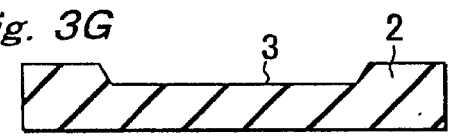
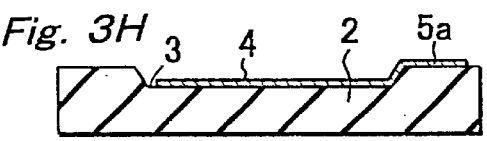
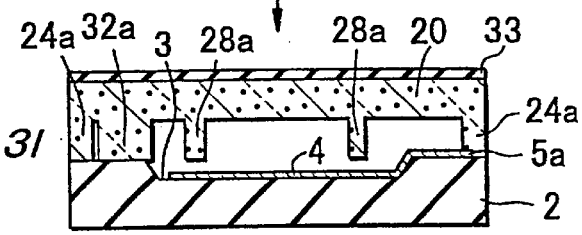
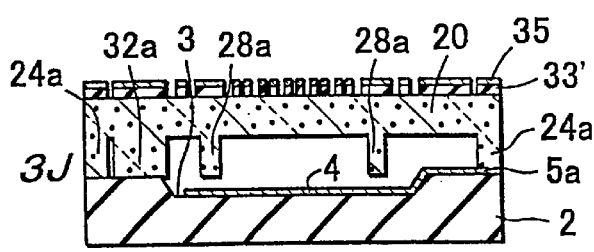
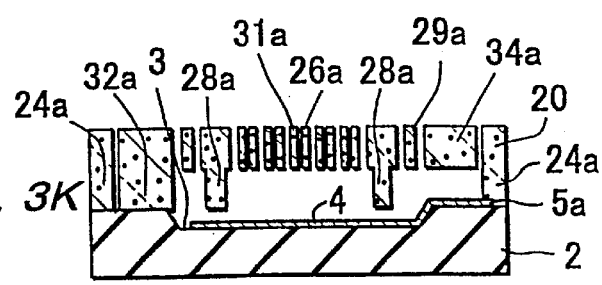

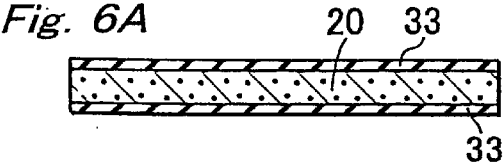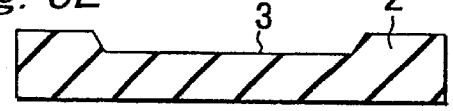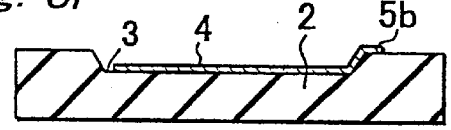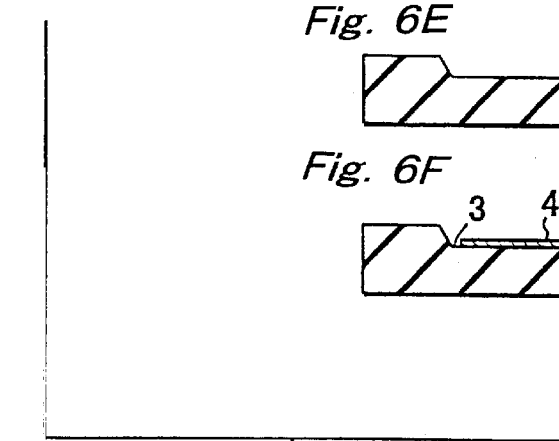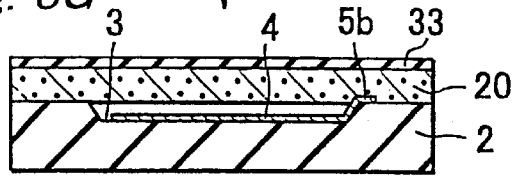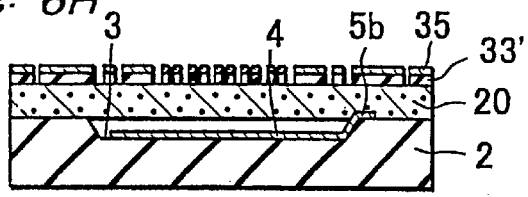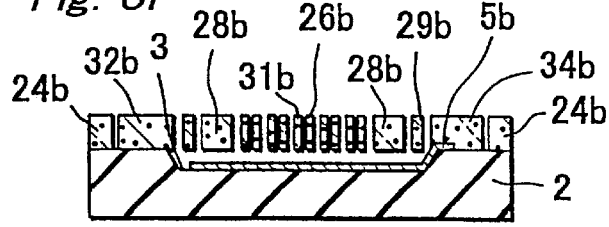

(印加磁界)
(角速度)
(コリオリ力)
(加振)

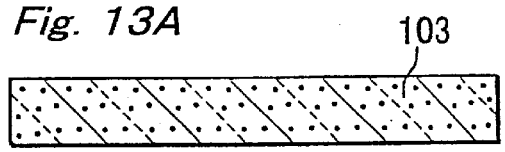
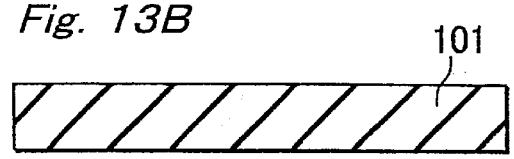
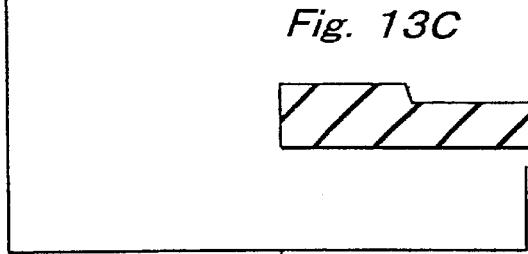
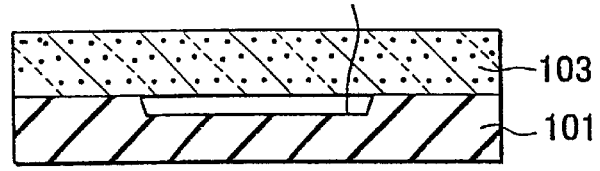
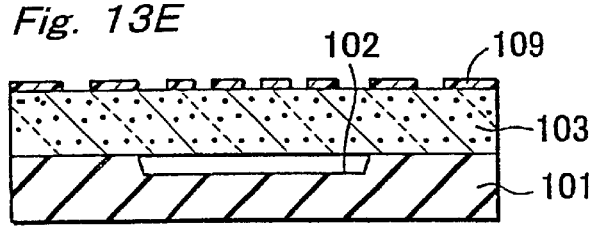
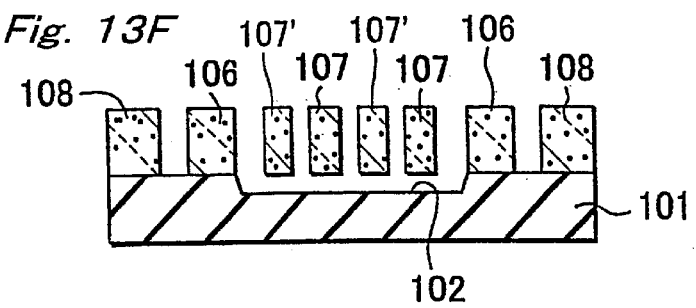

SILICON DEVICE

FIELD OF THE INVENTION

The present invention relates to a silicon device used in inertial force sensor or the like, and particularly to a silicon device comprising an insulating substrate and a beam-like structure made of silicon formed on the insulating substrate.

DESCRIPTION OF THE RELATED ART

Recently it has been made possible to etch silicon as deep as 100 μm by reactive ion etching technology using an inductively coupled plasma (ICP) as the activation energy source (hereinafter referred to as ICP-RIE process). This technique is viewed as a promising new technique for making silicon structures of high aspect ratios with a sufficiently high etching rate, in the field of device development by micromachining. In the past, wet processing using an alkaline solution was predominant as the process for deep etching of silicon substrates. But it is difficult to make a desired structure by wet processing, because the direction of etching depends on the crystalline orientation of silicon in the wet process. In contrast, the ICP-RIE process is not subject to the anisotropy of etching because it is a dry process. Thus the ICP-RIE process has such an advantage over the wet processing that far higher degree of freedom in the design of the configuration of structure can be achieved than in the case of wet processing.

However, such problems as described below have been encountered when the ICP-RIE process is applied to the manufacture of an inertial force sensor such as acceleration sensor or angular velocity sensor having such a structure as a beam-like structure made of silicon in the form of cantilever, simple beam or the like is supported on an insulating substrate made of glass or the like.

FIG. 12 shows the structure of an inertial force sensor 100 as an example of the fundamental structure of a silicon device of the prior art. FIG. 13A through FIG. 13F schematically show the manufacturing process of the inertial force sensor 100. Similar manufacturing process has been proposed, for example, by Z. Xiao et al. in Proc. of Transducers '99, pp.1518–1521, and S. Kobayashi et al. in Proc. of Transducers '99, pp.910–913.

FIG. 12 is a schematic plan view and FIG. 13F is a sectional view taken along lines XIII–XIII' of FIG. 12. The inertial force sensor 100 includes an insulating substrate 101 that has a recess 102 formed in the surface thereof, a beam-like structure 104 made of silicon bonded onto the surface of the insulating substrate 101 so as to interpose the recess therebetween and a frame 108 that surrounds the beam-like structure 104 made of silicon with a space kept therefrom and is bonded onto the insulating substrate 101. The beam-like structure 104 further includes two electrodes 105, 105'. The electrodes 105, 105' include a supporting section 106 and a plurality of cantilevers 107, a supporting section 106' and a plurality of cantilevers 107', respectively. The cantilevers 107 and 107' are arranged to oppose each other via a minute clearance.

A silicon substrate 103 is provided in the step of FIG. 13A, and the glass substrate 101 is provided in the step of FIG. 13B. A mask film is formed on the surface of the glass substrate 101 by the photolithography process, and a recess 102 is then formed by etching the surface of the glass substrate 101 to a depth in a range from several micrometers to several tens of micrometers by means of a diluted solution of hydrofluoric acid in the step of FIG. 13C. In the step of FIG. 13D, the silicon substrate 103 is bonded onto the surface of the glass substrate 101 by anodic bonding method. In the step of FIG. 13E, a mask film 109 having a pattern that corresponds to the planar configuration of the beam-like structure 104 shown in FIG. 12 is formed on the surface of the silicon substrate 103 by the photolithography. In the step of FIG. 13F, the silicon substrate 103 is etched through by the ICP-RIE process, thereby to form of the beam-like silicon structure 104 and the frame 108. Then the resist remaining on the surface of the silicon substrate is removed.

The step of FIG. 13F involves such a problem as described below. The mask film 109 shown in FIG. 13E generally has both wide apertures and narrow apertures. Consequently, when a dry etching process such as the ICP-RIE process is applied to the silicon substrate 103 that has the mask film 109, the silicon substrate is etched at a higher rate in a portion exposed through the wider aperture than in a portion exposed through the narrower aperture due to the micro loading effect. As a result, the portion of the silicon substrate 103 exposed through wider aperture is etched through earlier than the portion exposed through narrower aperture. At this time, etching gas enters into the clearance between the recess 102 of the glass substrate 101 and the back surface of the silicon substrate 103 through the hole which has been etched out in the silicon substrate 103 earlier. The etching gas that has entered erodes the back surface of the silicon substrate 103 till the portion exposed through the narrowest aperture is completely etched out. Thus the side wall of the supporting section 106 and the bottom surface or the side wall of the cantilever 107 are eroded. As a result, dimensions of the beam-like structure 104 deviate significantly from the design values, making it impossible to obtain the target characteristics of the device and resulting in lower reliability.

The present applicant found that the problem described above is caused by positive charging of the recess of the insulating substrate by the etching gas that has positive charge. Accordingly, the present applicant proposed a method for suppressing the erosion of the beam-like silicon structure by providing the recessed portion with an electrically conductive film that has electrical continuity with the supporting section (M. Chabloz, J. Jiao, Y. Yoshida, T. Matsuura, K. Tsutsumi, A Method to Evade Microloading Effect in Deep Reactive Ion Etching for Anodically Bonded Glass-Silicon Structures, Proc. MEMS2000, pp.283–287, Miyazaki, Japan, 2000). However, there is still a demand to further suppress the erosion of the beam-like silicon structure in order to improve the reliability.

There is also such a problem that an attempt to make the aperture sizes equal for the purpose of eliminating the microloading effect leads to a significant decrease in the degree of freedom in the design of the device structure.

Even when the aperture sizes are set to be the same in design, it is difficult to completely prevent the erosion of the supporting section and the cantilever in the actual process. This is because it is a common practice to apply over-etching to some extent in order to etch through reliably. In the case of an acceleration sensor, for example, a cantilever of a movable electrode and a cantilever of a fixed electrode are arranged to oppose each other via a minute clearance, with the minute clearance being formed in such a pattern as the width increases and decreases repetitively. The sensor has higher sensitivity as the ratio the clearance of the larger width to the clearance of the smaller width becomes higher. When the ratio becomes too high, however, the etching rate varies significantly from point to point over the surface due to the microloading effect, thus resulting in a lower etching rate in the narrow clearance region. This makes it necessary to apply over etching to the narrow clearance region, that causes more damages on the back surface of the silicon substrate during the etching process.

An object of the present invention is therefore to provide a silicon device that has higher reliability and offers a sufficient degree of freedom in the design of the device structure, by suppressing the erosion of the beam-like silicon structure due to the micro loading effect.

SUMMARY OF THE INVENTION

A silicon device of the present invention includes an insulating substrate having a recess formed on the surface thereof, a beam-like structure made of silicon formed on the front surface of the insulating substrate to surround the recess, said beam-like structure including at least one functional section having a supporting section bonded onto the insulating substrate and at least one cantilever formed integrally with the supporting section while extending across the recess; a frame made of silicon that surrounds the beam-like structure with a space kept therefrom and is formed onto the insulating substrate; and a conductive film having electrical continuity with the frame and formed on the surface of the insulating substrate at least in a portion right below the cantilever.

The silicon substrate is etched in such a mechanism of dry etching as activated ions having positive charge are accelerated by a negative bias formed right above the silicon substrate thereby to collide onto the silicon substrate with a sufficient energy. In the case of the ICP-RIE process, sulfur fluoride ion ($SFx^+$) is usually used as the activated etching gas. The ion changes into silicon fluoride ($SiFx$) through reaction with silicon, and is discharged to the outside. The negative bias is formed immediately above the silicon substrate by applying a high frequency field to a substrate holder that also serves as a cathode whereon the silicon substrate is placed. Therefore, erosion of the back surface of the silicon substrate is considered to occur as the $SFx^+$ that has entered the clearance between the back surface of the silicon substrate and the recess of the insulating substrate is repulsed by the surface of the insulating substrate and collides with the back surface of the silicon substrate. Repulsion of the $SFx^+$ on the surface of the insulating substrate may be caused also by electrical repulsion force as well as kinematic scattering.

FIG. 9A and FIG. 9B are schematic sectional views showing a silicon substrate 53 bonded onto the surface of an insulating substrate 51, which has a recess, so as to surround the recess 52, in a state of the silicon substrate 53 being dry-etched. The silicon substrate 53 has a mask film 59 formed on the surface thereof for the purpose of forming a functional section. The silicon substrate 53 is formed into a beam-like silicon structure 56 and a frame 58 through dry etching, while the beam-like silicon structure 56 is further formed into a movable electrode 57 and a fixed electrode 57'. The movable electrode 57 comprises cantilevers 572, 572 and a supporting section 571 that supports the cantilevers, while the fixed electrode 57' comprises cantilevers 572', 572' and a supporting section 571' that supports the cantilevers During the dry etching process, the surface of the recess 52 of the insulating substrate 51 is charged with positive charge 62 by the etching gas, for example, $SFx^+$ 61 which impinges thereon a number of times. The surface of the recess 52 charged with the positive charge repulses the following $SFx^+$ 61. The repulsed $SFx^+$ 61 changes the direction of the movement thereof before reaching the recess 52 and instead impinges on the back surface of the silicon substrate 53, thereby eroding the cantilever 572, 572'. Also it may be that the $SFx^+$ 61 which would otherwise be bound to hit the insulating substrate 51 at right angles is distracted from the trajectory by the recess 52 that is positively charged, and impinges on and erodes the side walls of the supporting sections 571, 571'. Therefore, in order to restrict the erosion of the back surface of the silicon substrate 53 or the supporting sections 571, 571', it is effective to prevent the surface of the recess 52 of the insulating substrate 51 from being positively charged.

FIG. 10A and FIG. 10B are schematic sectional views showing the structure of the silicon device proposed by M. Chabloz et al. mentioned above, that is similar to the structure shown in FIG. 9A except for the electrically conductive film 54 that has electrical continuity with the supporting section 571 via an electrical continuity section 55a, and is formed on the surface of the recess. When the etching gas 61 collides with the electrically conductive film 54, the electric charge dissipates through the supporting section 571 so as to become inactive. During dry etching, the silicon substrate 53 is held at a negative potential, the same potential as the substrate holder (not shown). Therefore, collision of the etching gas onto the electrically conductive film 54 neutralizes the charge thereby accelerating the deactivation of the etching gas. This enables it to significantly restrict erosion of the back surface of the silicon substrate 53. But the cantilever 572' was made smaller than the cantilever 572 as shown in FIG. 10B. This is supposedly caused because positive charge 62 that has migrated from the electrically conductive film 54 through the supporting section 571 charges the cantilever 572 positively, thus repelling the etching gas which passes near the cantilever 572 thereby forcing it to impinge on the cantilever 572' so as to erode it. Although the degree of damage resulting from charging of the silicon cantilever is lower than that caused by charging of the insulating substrate, it may cause damage to the base portion of the cantilever and lead to lower reliability depending on the mask pattern.

According to the present invention, the electrically conductive film 54 that has electrical continuity via the electrical continuity section 55b with the frame 58 is formed on the surface of the recess.

Since the frame 58 is separated from the beam-like silicon structure 54 and is bonded to the insulating substrate 51, the positive charge does not migrate from the electrical conductive film 54 into the cantilever. Moreover, there is no minute structure such as cantilever that requires high precision machining near the frame 58. Therefore, even if the frame 58 is charged, it does not cause damage to the minute structures.

Furthermore, linkage of the frame 58 with the frames of adjacent devices is maintained until processing of the wafer has been completed and the wafer separated into individual devices by dicing, and the frame has the largest volume among the silicon structures formed on the wafer. As a result, amount of charge per unit volume (volume charge density) can be minimized compared to a case of connecting to other silicon structure on the wafer. Thus it is made possible to minimize the repulsion force against the etching gas that passes nearby, thereby to further restrict the erosion of the beam-like silicon structure by the etching gas.

The beam-like structure of the silicon device according to the present invention may also include two or more functional sections that are electrically insulated from each other and have substantially the same volumes.

The silicon device of the present invention is an acceleration sensor that includes an insulating substrate having a recess formed on the surface thereof, a beam-like structure made of silicon formed on the front surface of the insulating substrate to surround the recess, and a frame made of silicon that surrounds the beam-like structure with a space kept therefrom and bonded onto the insulating substrate, wherein the beam-like structure includes a movable electrode and a fixed electrode with the movable electrode and the fixed electrode each having a supporting section bonded onto the insulating substrate and a comb-shaped electrode that consists of a plurality of cantilevers formed integrally with the support section and extending across the recess, while the cantilevers of the movable electrode and the cantilevers of the fixed electrode are disposed to oppose each other via a minute clearance, and an electrically conductive film which is electrically connected with the frame is formed on the surface of the insulating substrate at least in a portion right under the cantilever.

In the acceleration sensor described above, the movable electrode and the fixed electrode may have substantially the same volumes.

The silicon device of the present invention is an angular velocity sensor that includes an insulating substrate having a recess formed on the surface thereof, a beam-like structure made of silicon formed on the front surface of the insulating substrate to surround the recess, and a frame made of silicon that surrounds the beam-like structure with a space kept therefrom and bonded onto the insulating substrate, wherein the beam-like structure includes a movable electrode and a fixed electrode with the movable electrode and the fixed electrode each having a comb-shaped electrode that consists of a plurality of cantilevers extending across the recess, while the movable electrode is supported on the frame so as to be capable of vibrating in the horizontal direction on the surface of the insulating substrate and the fixed electrode is bonded onto the insulating substrate, with the cantilevers of the movable electrode and the cantilevers of the fixed electrode being disposed to oppose each other via minute clearance, and an electrically conductive film which is electrically connected with the frame is formed on the surface of the insulating substrate at least in a portion right under the cantilever.

The silicon device of the present invention includes an insulating substrate having a recess formed on the surface thereof, a beam-like structure made of silicon formed on the front surface of the insulating substrate to surround the recess, and a frame made of silicon that surrounds the beam-like structure with a space kept therefrom and is bonded onto the insulating substrate, wherein the beam-like structure has at least one functional section that includes a supporting section bonded onto the insulating substrate and at least one cantilever that is formed integrally with the supporting section and extending across the recess, while the beam-like silicon structure includes two or more functional structures that are electrically insulated from each other and have different volumes, and an electrically conductive film that has electrical continuity with the supporting section of the functional section of the largest volume is formed on the surface of the insulating substrate at least in a portion right below the cantilever. Even when the functional section of the largest volume is electrically charged, volume charge density of this functional section can be made the lowest among the functional sections. Thus it is made possible to minimize the repulsion force against the etching gas that passes nearby, thereby to further restrict the erosion of the beam-like silicon structure by the etching gas.

The silicon device of the present invention is an acceleration sensor that includes an insulating substrate having a recess formed on the surface thereof, a beam-like structure made of silicon formed on the front surface of the insulating substrate to surround the recess, and a frame made of silicon that surrounds the beam-like structure with a space kept therefrom and bonded onto the insulating substrate, wherein the beam-like structure includes a movable electrode and a fixed electrode with the movable electrode and the fixed electrode each having a supporting section bonded onto the insulating substrate and a comb-shaped electrode that consists of a plurality of cantilevers formed integrally with the supporting section and overhanging into the clearance region, while the cantilevers of the movable electrode and the cantilevers of the fixed electrode are disposed to oppose each other via minute clearance, the movable electrode and the fixed electrode being formed to have different volumes, and an electrically conductive film which is electrically connected with the supporting section of either the movable electrode or the fixed electrode that has the larger volume is formed on the surface of the insulating substrate at least in a portion right under the cantilever.

The silicon device of the present invention can be manufactured by separating a silicon wafer, which is used as the silicon substrate whereon a number of silicon devices have been formed, into individual silicon devices by dicing. For example, in a method for manufacturing a silicon device including an insulating substrate having a recess formed on the surface thereof, a beam-like structure made of silicon formed on the front surface of the insulating substrate to surround the recess, and a frame made of silicon that surrounds the beam-like structure with a space kept therefrom and is bonded onto the insulating substrate, with the silicon device having at least one functional section in which the beam-like structure includes a supporting section bonded onto the insulating substrate and at least one cantilever that is formed integrally with the supporting section and extending across the recess, the silicon device can be manufactured in the process including a step of forming the electrically conductive film on the surface of the recess at least in a portion right under the cantilevers and extending the electrically conductive film over the surface around the recess thereby to form the electrical continuity section with the frame, a step of forming a first mask film on the surface of the silicon substrate in a pattern corresponding to the configuration of the supporting section, a step of etching the surface of the silicon substrate whereon the first mask film is formed so as to form the supporting section, a step of bonding the silicon substrate that has the supporting section and the insulating substrate that has the electrically conductive film so that the both surfaces oppose each other, a step of forming a second mask film on the back surface of the bonded silicon substrate in a pattern corresponding to the configuration of the cantilevers, and a step of dry etching the back surface of the silicon substrate whereon the second mask film has been formed so as to penetrate through the silicon substrate thereby to form the cantilevers extending across the recess in a desired pattern.

BRIEF DESCRIPTION OF THE DRAWINGS

The above and other objects and features of the present invention will become more apparent from the following description of the preferred embodiments thereof made with reference to the accompanying drawings, throughout which like parts are designated by like reference numerals and which:

FIG. 3A through FIG. 3K are sectional views schematically showing the process of manufacturing the acceleration sensor according to the first embodiment of the present invention, FIG. 3K showing a sectional view taken along line III–III' of FIG. 2.

FIG. 6A through FIG. 6I are sectional views schematically showing the process of manufacturing the acceleration sensor according to the third embodiment of the present invention, FIG. 6I showing a sectional view taken along line VI–VI' of FIG. 5.

FIG. 13A through FIG. 13F are sectional views schematically showing the method of manufacturing the silicon device shown in FIG. 12, FIG. 13F showing a sectional view taken along line XIII–XIII' of FIG. 12.

DETAILED DESCRIPTION OF THE PREFERRED EMBODIMENTS

Embodiment 1

Figure 1:
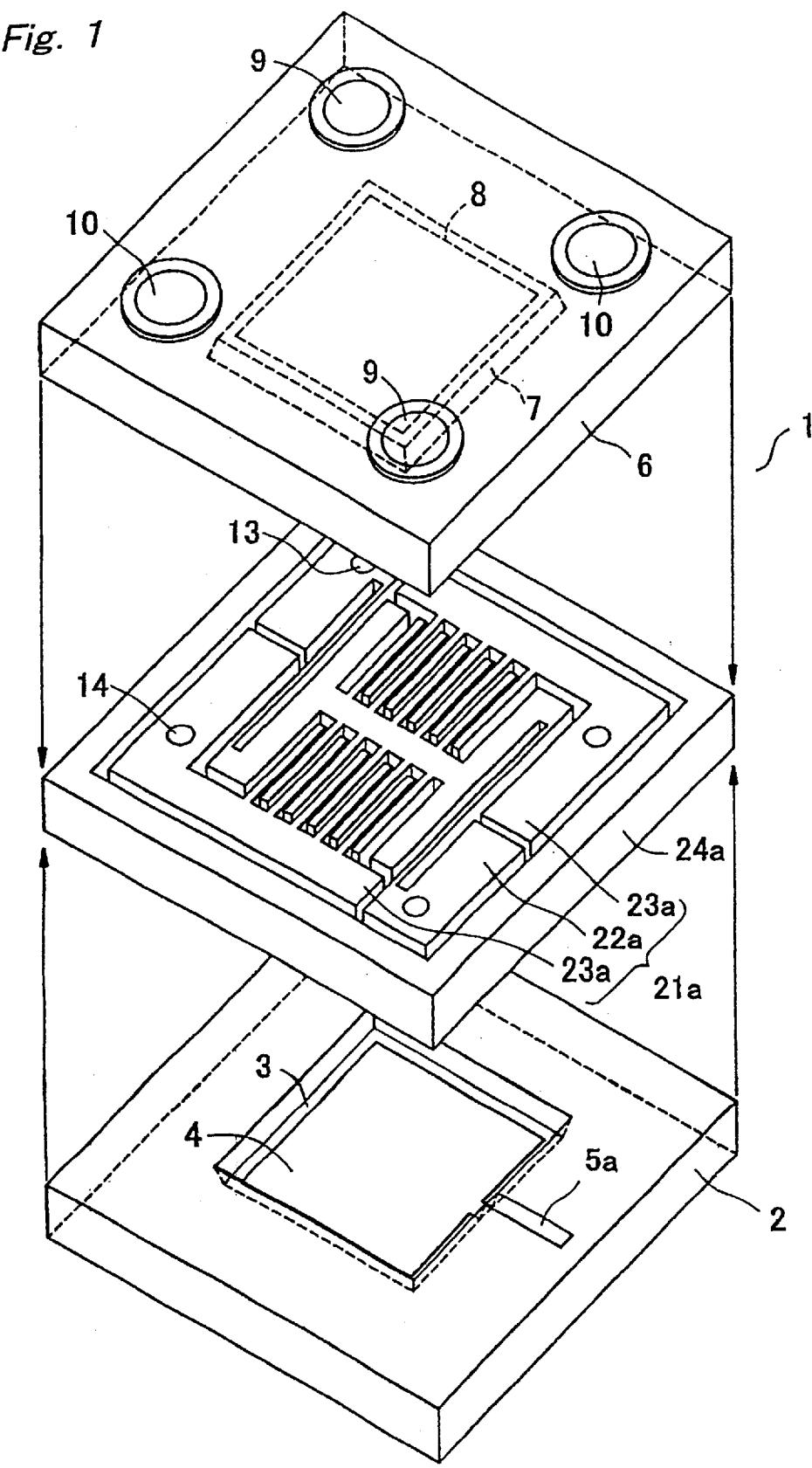
FIG. 1 is an exploded perspective view schematically showing the overall structure of the acceleration sensor according to the first embodiment of the present invention.

As an example of the silicon device of the present invention, an application thereof to acceleration sensor will be described below As shown in the exploded perspective view of FIG. 1, the acceleration sensor 1 includes a beam-like structure 21a made of silicon, a lower glass substrate 2 having a recess 3 formed in the surface thereof in order to make a clearance portion, and an upper glass substrate 6 having a recess 7 formed in the surface thereof. The acceleration sensor 1 has such a structure as the beam-like structure 21a is bonded so as to be interposed between the lower glass substrate 2 and the upper glass substrate 6 so that the recess 3 and the recess 7 oppose each other, with the inside of the acceleration sensor 1 being hermetically sealed. The upper glass substrate 6 has electrode leads 9, 10 which penetrate through the substrate for connecting to outside circuits, while the electrode leads 9, 10 make contact with metal electrodes 13, 14, respectively, of the beam-like structure 21 in electrical continuity. The beam-like structure 21a includes two functional sections of a movable electrode 22a and fixed electrodes 23a, 23a. The electrically conductive film 4 is formed over the entire surface of the recess 3 of the lower glass substrate 2, with part of the electrically conductive film extending over the surface around the recess 3 so as to form an electrical continuity section 5a that secures continuity with the frame 24a. The electrical continuity section 5a is bonded onto the lower glass substrate at a position right below the frame 24a.

Figure 2:
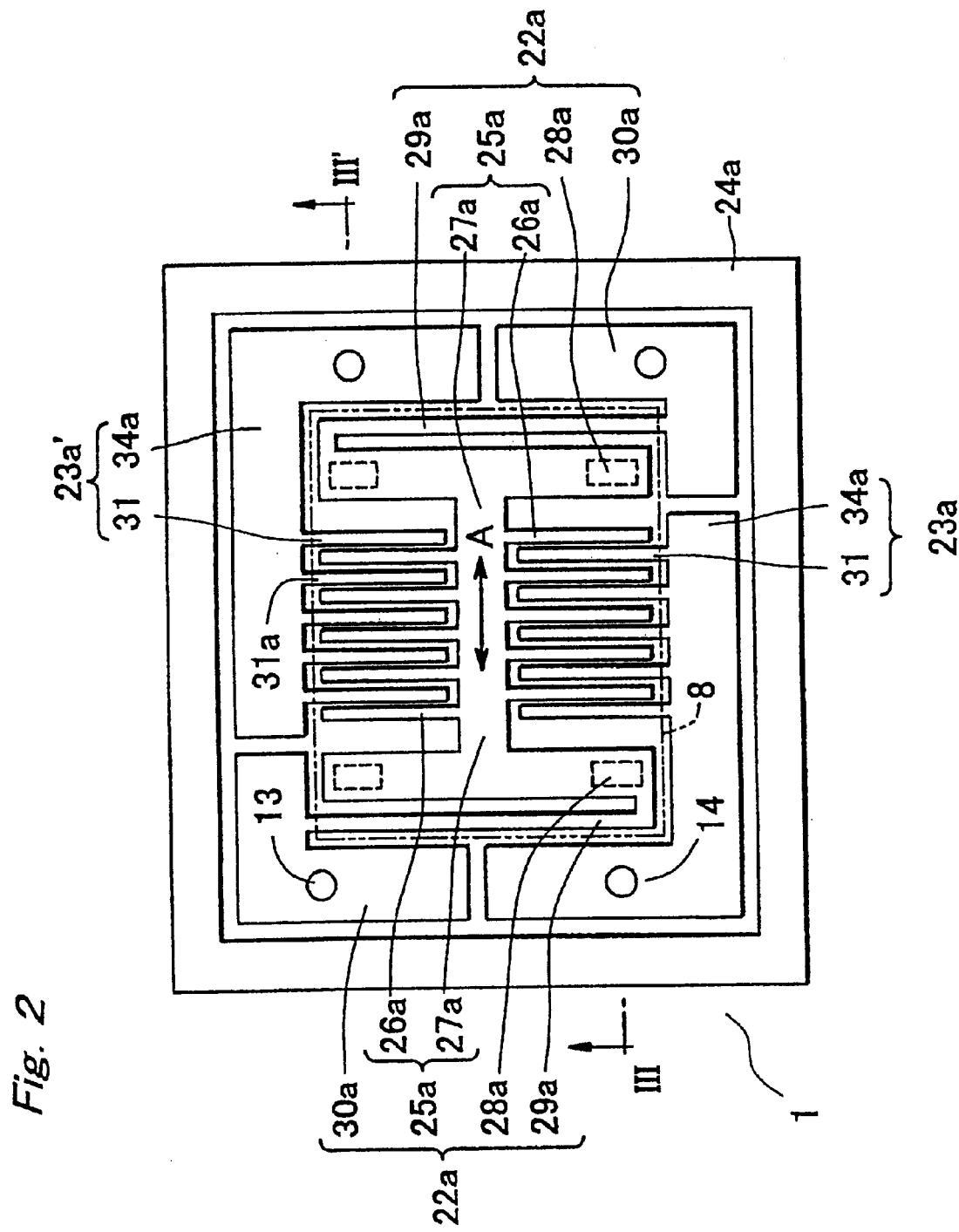
FIG. 2 is a plan view showing the structure of the acceleration sensor according to the first embodiment of the present invention, focusing on the beam-like structure.

Further as shown in FIG. 2, the movable electrode 22a includes a comb-shaped electrode 25a which consists of a plurality of cantilevers 26a disposed at equal intervals along both longitudinal edges of a base portion 27a and extending from the base portion 27a over the recess 3, impact protection stoppers 28a, 28a which are connected to both ends of the base portion 27a and restrict the vertical displacement of the comb-shaped electrodes 25a, 25a, two beams 29a, 29a which are linked with the impact protection stoppers 28a, 28a and support the comb-shaped electrode 25a and the impact protection stoppers 28a, 28a in space, and supporting sections 30a, 30a which are bonded onto the lower glass substrate 2 so as to support the beams 29a, 29a, wherein these components are formed integrally. The impact protection stopper 28a also has an effect of protecting the beams 29a, 29a and the comb-shaped electrodes 25a, 25a from being damaged by strong impact.

The fixed electrodes 23a, 23a' each include a comb-shaped electrode 31 which consists of a plurality of cantilevers 31a arranged to oppose the plurality of cantilevers 26a of the comb-shaped electrode 25a, that extend over the recess 3. The fixed electrode 23a is further bonded onto the lower glass substrate 2 via a supporting section 32a which supports the comb-shaped electrode 31 and also serves as the base portion, while the fixed electrode 23a' is bonded onto the lower glass substrate 2 via a supporting section 34a which supports the comb-shaped electrode 31 and also serves as the base portion.

As shown in FIG. 1, a metal film 8 is formed in the recess 7 of the upper glass substrate 6. The metal film 8 is provided for the purpose of, when carrying out anodic bonding of the beam-like silicon structure 21 and the upper glass substrate 6, preventing the movable electrode 22 which has been formed earlier from sticking onto the upper glass substrate 6.

The sensor detects acceleration acting in the direction of arrow A in the plane of silicon substrate. The comb-shaped electrodes 25a, 25a constituted from the plurality of cantilevers and the comb-shaped electrodes 31, 31 contribute to maximizing of the opposing area of the electrodes, which is proportional to the change in electrostatic capacity, in a limited area of the sensor. When subjected to acceleration, the base portion 27a of the movable electrode 22a is displaced in the direction of arrow A (principal direction) so that the distance between the cantilever 26a of the comb-shaped electrodes 25a and the cantilever 31a of the comb-shaped electrodes 31 changes. This change in the distance causes a change in the electrostatic capacity. This change in the electrostatic capacity is converted into a voltage that is proportional to the acceleration by a C-V converter which is installed outside the sensor, and is output. In this embodiment, linearity of the output can be improved since differential detection system is employed where two sets of the comb-shaped electrodes 25a and 31 are used.

Now an example of the method for manufacturing the acceleration sensor of this embodiment will be described below with reference to FIG. 3A through FIG. 3K. In the steps shown in FIG. 3A through FIG. 3D, the silicon substrate is processed on the surface thereof so as to form the supporting section of the beam-like structure, while in the steps shown in FIG. 3E through FIG. 3H the electrically conductive film is formed on the lower glass substrate. Then in the steps shown in FIG. 3I through FIG. 3K, the silicon substrate and the lower glass substrate are bonded together and the silicon substrate is processed so as to form the comb-shaped electrodes of the beam-like structure. The upper glass substrate that has been processed is then bonded on the beam-like structure and electrode leads are formed on the upper glass substrate, followed by the separation of individual acceleration sensors by dicing, thereby completing the acceleration sensors having the structure shown in FIG. 1. The surface of the silicon substrate refers to the side whereon the lower glass substrate is bonded.

Now the steps of the manufacturing process will be described in detail below.

In the step of FIG. 3A, a silicon wafer for the silicon substrate 20 (400 μm thick) that has a thermal oxidation film 33 formed on the surface to a thickness of 1 μm is prepared. In the step of FIG. 3B, the thermal oxidation film 33 is removed from one surface of the silicon substrate 20 using buffered hydrofluoric acid. In the step of FIG. 3C, a first mask film 35 is formed from a resist with a pattern corresponding to the configuration of the supporting section by photolithography on the surface of the silicon substrate 20 from which the thermal oxidation film 33 has been removed. In the step of FIG. 3D, the surface of the silicon substrate 20 that has the first mask film 35 is etched to a depth of 250 μm by dry etching of the ICP-RIE process. Then the resist remaining on the surface is removed thereby to form the frame 24a, the supporting section 32a and the impact protection stopper 28a.

In the step of FIG. 3E, the lower glass substrate 2 (400 μm thick) is provided. In the step of FIG. 3F, the mask film 12 is formed from a resist for the formation of recess by photolithography on the surface of the lower glass substrate 2. In the step of FIG. 3G, the surface of the lower glass substrate 2 is etched to a depth of 20 μm using a 10% aqueous solution of hydrofluoric acid, thereby to form the recess 3. The recess 3 is used to make the clearance when the silicon substrate 20 and the lower glass substrate 2 are bonded together. In the step of FIG. 3H, a Cr film is formed over the entire surface of the recess 3 and to partially extend over the surface around the recess 3 by photolithography, thereby to form the electrically conductive film 4 made of Cr. The electrically conductive film 4 which extends over a part of the portion around the recess 3 forms the electrical lead 5a that electrically connects with the silicon substrate 20.

In the step of FIG. 3I, the surface of the lower glass substrate 2 and the surface of the silicon substrate 20 are bonded together by anodic bonding process. At this time, the portion of the supporting section 34a located right above the electrical lead 5a has been removed by etching in the step shown in FIG. 3D, so that the electrical lead 5a is bonded onto the frame 24a without making contact with the supporting section 34a. In the step of FIG. 3J, a second mask film 35 is formed from a resist by the photolithography processing on the surface of the silicon substrate 20, followed by the formation of a thermal oxidation film mask 33' by electron cyclotron resonance reactive ion etching process (hereinafter referred to as ECR-RIE process). In the step of FIG. 3K, back surface of the silicon substrate 20 is etched to a depth of at least 150 μm by the ICP-RIE process using the second mask film 35 and the thermal oxidation film 33' as the masks. This results in the formation of the movable electrode 22a, the fixed electrode 23a and the frame 24a penetrating the silicon substrate 20. The cantilever 26a of the movable electrode 22a and the cantilever 31a of the fixed electrode 23a are disposed to oppose each other via a minute clearance, with the minute clearance being formed in such a pattern as the width increases and decreases repetitively. Then the thermal oxidation film 33 that remains on the back surface of the silicon substrate 20 is removed by the ECR-RIE process. Depth 150 μm of etching is determined by subtracting the depth of etching 250 μm in the step of FIG. 3D from the thickness 400 μm of the silicon substrate 20.

The surface of the upper glass substrate is processed similarly to the steps shown in FIG. 3E through FIG. 3H, thereby to form the recess 7 to a depth of 20 μm. Then a Cr film is formed on the surface of the recess 7 by the photolithography process, thereby to form the anti-sticking film 8 made of Cr. Then the upper glass substrate 6 is sand blasted to provide the electrode-leading portion 10 constituted from a through hole.

The back surface of the silicon substrate 20 and the front surface of the upper glass substrate 6 are bonded together by anodic bonding, and an electrode film made of Pt is formed on the electrode leading portion 10. The wafer is diced thereby to separate into individual acceleration sensors 1.

According to this embodiment, when the electrically conductive film 4 that has electrical continuity with the frame 24a functions as an anti-charge film that prevents the surface of the recess 3 from being positively charged when the movable electrode 22a and the fixed electrode 23a are formed by the ICP-RIE process. The mechanism is as follows. The etching gas that has positive charge collides with the electrically conductive film 4 during dry etching. The positive charge of the etching gas dissipates through the electrically conductive film 4 and the frame 24a and is neutralized by negative potential of the frame 24a. Therefore, since there occurs no collision of the etching gas having the positive charge onto the silicon substrate surface due to the electric repulsion force of the recess 3, erosion of the side walls of the comb-shaped electrodes 25a, 31, the anti-impact stoppers 28a, 28a and the supporting sections 32a, 34a does not occur.

Moreover, the supporting sections 32a, 34a are located between the frame 24a and minute structures that require high precision such as the comb-shaped electrodes 25a, 31 and the beam 29a. Consequently, even when the frame 24a is positively charged, only the supporting sections 32a, 34a that do not require high precision may be damaged while the minute structures are not affected.

Furthermore, continuity between the frames of adjacent sensors is maintained when the movable electrode 22a and the fixed electrode 23a are formed by the ICP-RIE process, and therefore the frame has the largest volume among the silicon structures formed on the wafer including the beam-like structure and the frame. As a result, the volume charge density has the lowest value among the structures on the wafer. Thus it is made possible to minimize the repulsion force against the etching gas while it passes near the frame.

Thus the acceleration sensor according to the present invention has such features as the sensitivity experiences less deterioration and there are less variations in the characteristics among the sensors, because the clearance between the plurality of cantilevers of the comb-shaped electrode is formed with high precision and weights of movable electrode and the fixed electrode can be controlled to desired values.

While the electrically conductive film of the acceleration sensor according to this embodiment may be made of various electrically conductive materials such as chromium, aluminum, nickel, tantalum, platinum and gold which are metals that can be deposited by vapor deposition, chromium which deposits well on the glass substrate is preferable. In case it is desired to allow visible light to transmit into the sensor, indium-tin oxide (ITO) that combines electrical conductivity with transparency may be used. Thickness of the electrically conductive film is in a range from 10 nm to 1 μm, and preferably from 200 nm to 500 nm. When the thickness is below 10 nm, sufficient durability cannot be ensured during the reactive etching process, and a film thicker than 1 μm requires longer time to form.

While the insulating substrate may be made of any insulating material as long as the material can be processed into a desired shape, glass substrate is preferable.

In this embodiment, the recess is formed in the lower glass substrate, and the recess is used as the clearance between the glass substrate and the silicon substrate. But effects similar to those of this embodiment can also be achieved by forming an electrically conductive film on the flat surface of the lower glass substrate without forming the recess in the lower glass substrate, and removing the tip of the anti-impact stopper of the silicon substrate thereby forming the clearance between the glass substrate and the silicon substrate.

Embodiment 2

The silicon device of this embodiment has a structure similar to that of the first embodiment, except for making the movable electrode and the fixed electrode that constitute the beam-like silicon structure with substantially the same volumes.

Figure 4:
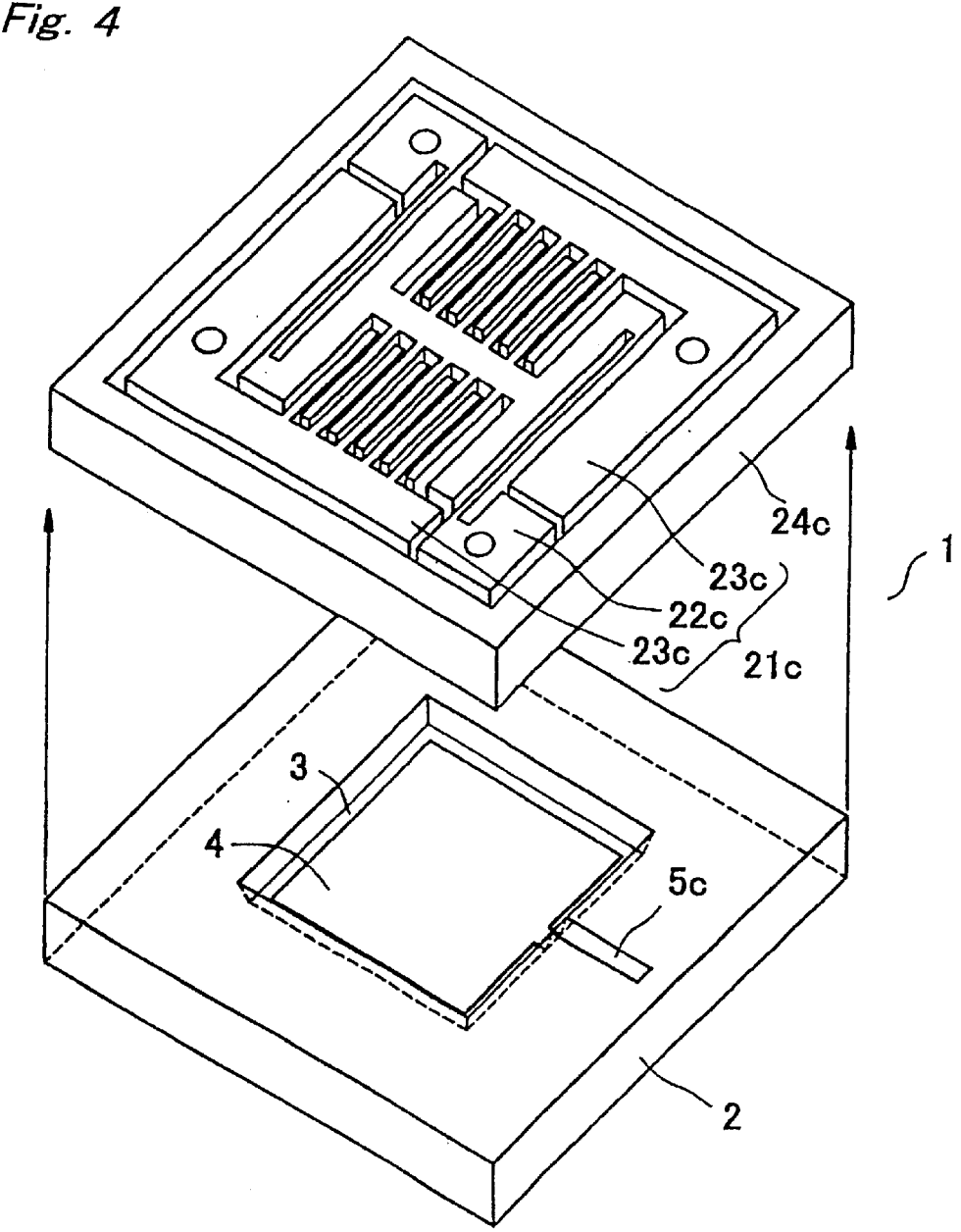
FIG. 4 is an exploded perspective view schematically showing the structure of an acceleration sensor according to the second embodiment of the present invention.

FIG. 4 is an exploded perspective view showing the structure of an acceleration sensor of this embodiment. Volumes of the movable electrode 22c and the fixed electrode 23c are made equal by adjusting the dimensions and shapes of the supporting sections of the movable electrode 22c and the fixed electrode 23c. This is because changing the dimensions and shapes of the supporting sections does not affect the characteristics of the sensor.

As mentioned in "Description of the Related Art", the sensor has higher sensitivity as the ratio of the clearance of the larger width to the clearance of the smaller width becomes higher. When this ratio becomes too high, however, the etching rate varies significantly from point to point over the surface due to the microloading effect. Therefore, over etching is required in the narrow clearance region, but over etching results in greater damage on the back surface of the silicon substrate. Meanwhile, the present applicant found that longer duration of over etching causes the beam-like structure that has been separated to be positively charged. As a result, when over etching is carried out for a long period of time in case the movable electrode and the fixed electrode have different volumes, volume charge density of an electrode having smaller volume becomes larger which causes greater repulsion force to act on the etching gas that passes near the electrode having smaller volume. According to this embodiment, however, since the volume charge densities of the electrodes can be made lower by making the volumes of the movable electrode and the fixed electrode equal, the repulsion force acting on the etching gas that passes near the electrode can be decreased.

The silicon device of this embodiment has the effect of decreasing the volume charge densities of the electrodes as described above in addition to the effect of the electrically conductive film described in conjunction with the first embodiment, and is therefore capable of suppressing the erosion of the beam-like silicon structure even when over etching is required.

Embodiment 3

Silicon device of this embodiment has a structure similar to that of the first embodiment, except that it is manufactured without etching the back surface of the silicon substrate (correspond to the step shown in FIG. 3D) while using a silicon substrate thinner than that of the first embodiment, for example 150 μm in thickness, and the electrically conductive film is electrically connected to the supporting section, not to the frame.

Figure 5:
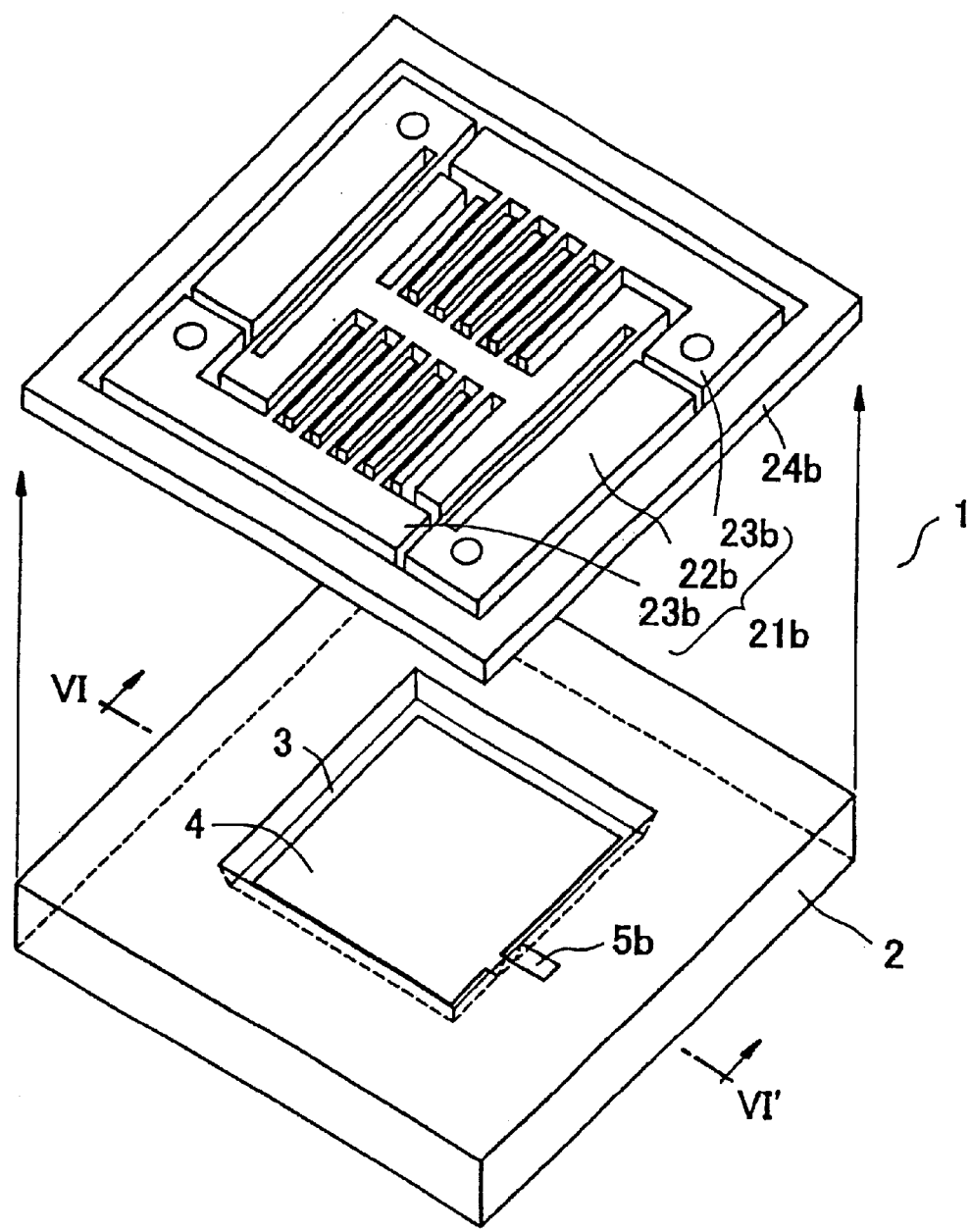
FIG. 5 is an exploded perspective view schematically showing the structure of an acceleration sensor according to the third embodiment of the present invention.

FIG. 5 is an exploded perspective view showing the structure of an acceleration sensor of this embodiment. A beam-like silicon structure 21b and a frame 24b are made thinner than the case of the first embodiment, and volume of the supporting section of the movable electrode 22b is made larger than volume of the fixed electrode 23b.

FIG. 6A through FIG. 6I show a process of manufacturing the acceleration sensor shown in FIG. 5. In the step of FIG. 6A, a silicon wafer for the silicon substrate 20 (150 μm thick) that has the thermal oxidation film 33 formed on the surface to a thickness of 1 μm is prepared. In the step of FIG. 6B, the thermal oxidation film 33 is removed from one surface of the silicon substrate 20 using buffered hydrofluoric acid. Since the surface of the silicon substrate 20 from which the thermal oxidation film 33 has been removed is not etched, the steps of the first embodiment shown in FIG. 3C and FIG. 3D are not necessary.

In the step of FIG. 6C, the lower glass substrate 2 (400 μm thick) is provided. In the step of FIG. 6D, the mask film 12 is formed from a resist for the formation of recess by photolithography on the surface of the lower glass substrate 2. In the step of FIG. 6E, the surface of the lower glass substrate 2 is etched to a depth of 20 μm using a 10% aqueous solution of hydrofluoric acid, thereby to form the recess 3. The recess 3 is used to make the clearance when the silicon substrate 20 and the lower glass substrate are bonded together. In the step of FIG. 6F, a Cr film is formed over the entire surface of the recess 3 and to partially extend over the surface around the recess 3 by photolithography, thereby to form the electrically conductive film 4 made of Cr. The electrically conductive film 4 which extends over a part of the portion around the recess 3 forms the electrical lead 5b that electrically connects with the silicon substrate 20.

In the step of FIG. 6G, the surface of the lower glass substrate 2 and the surface of the silicon substrate 20 are bonded together by anodic bonding process. In the step of FIG. 6H, a second mask film 35 is formed from a resist by the photolithography processing on the surface of the silicon substrate 20. Then a thermal oxidation film mask 33' is formed by the ECR-RIE process. In the step of FIG. 6I, back surface of the silicon substrate 20 is etched by the ICP-RIE process using the second mask film 35 and the thermal oxidation film 33' as the masks. This results in the formation of the beam-like structure 21b and the frame 24b penetrating the silicon substrate 20. The cantilever 26b of the movable electrode 22b and the cantilever 31b of the fixed electrode 31 are disposed to oppose each other via a minute clearance, with the minute clearance being formed in such a pattern as the width increases and decreases repetitively. The electrical lead 5b is directly connected to the supporting section 34b of the movable electrode 22b. Then the thermal oxidation film 33 that remains on the back surface of the silicon substrate 20 is removed by the ECR-RIE process.

The surface of the upper glass substrate 6 is processed similarly to the steps of the first embodiment shown in FIG. 3E through FIG. 3H, thereby to form the recess. Then a Cr film is formed on the surface of the recess by the photolithography process, thereby to form the anti-sticking film made of Cr. Then the upper glass substrate is sand blasted to provide the electrode-leading portion constituted from a through hole.

The back surface of the silicon substrate 20 and the front surface of the upper glass substrate are bonded together by anodic bonding, and an electrode film made of Pt is formed on the electrode leading portion. The wafer is diced thereby to separate into individual acceleration sensors.

The acceleration sensor of this embodiment has such a structure as the electrically conductive film 4 is bonded via the electrical lead 5b to the supporting section 34b of the movable electrode 22b, and the movable electrode 22b has larger volume than the fixed electrode 23b. This enables it to make the volume charge density of positive charge lower than that of a case where the electrically conductive film 4 is bonded to the fixed electrode 23b that has smaller volume. Moreover, the acceleration sensor that is suitable for volume production can be provided, since the step of etching on the back surface of the silicon substrate is not necessary.

In this embodiment, volume of the movable electrode is made larger than the volume of the fixed electrode, but the present invention is not limited to this constitution. For example, volume of the fixed electrode may be made larger with the electrically conductive film being bonded onto the supporting section of the fixed electrode or, alternatively, volume of a functional section other than the fixed electrode and the movable electrode may be made larger with the electrically conductive film being bonded onto the supporting section of this particular functional section.

Embodiment 4

Figure 7:
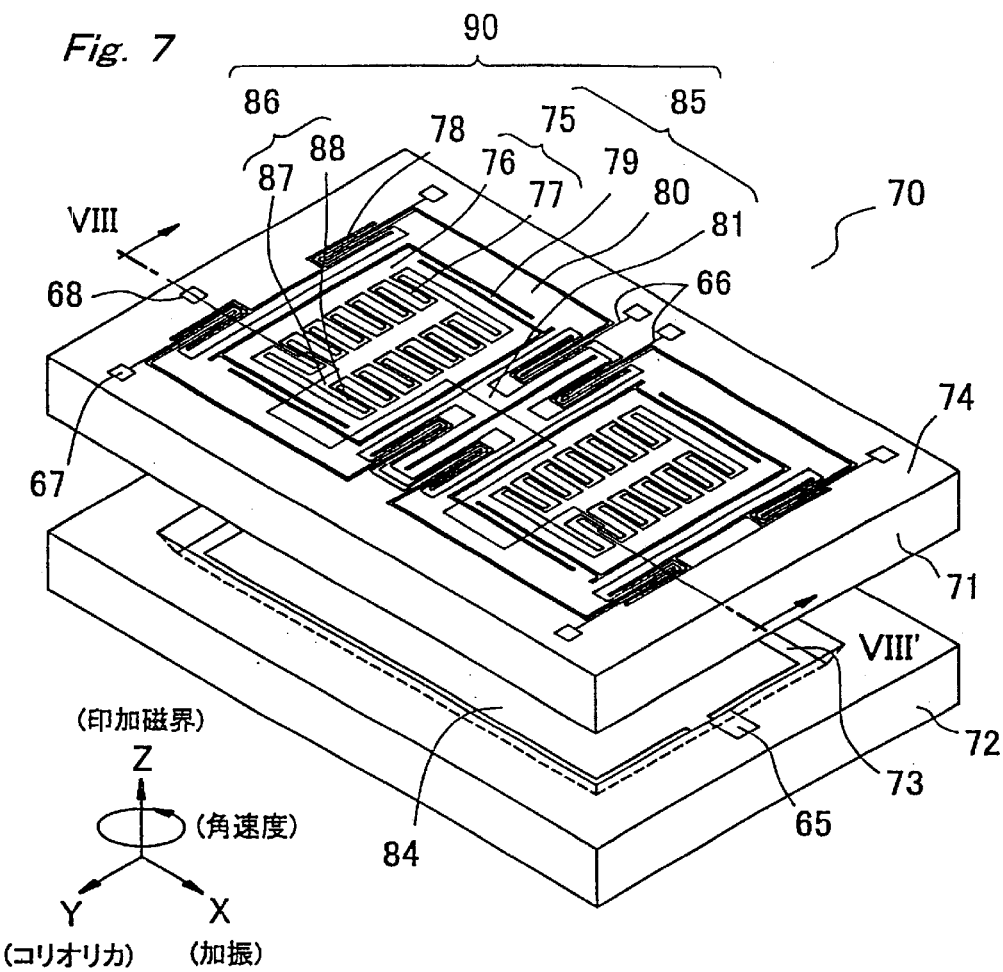
FIG. 7 is an exploded perspective view schematically showing the structure of an angular velocity sensor according to the fourth embodiment of the present invention.
Figure 8:
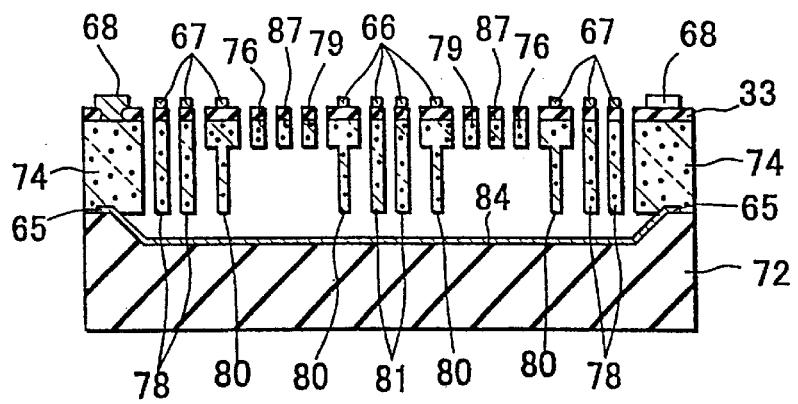
FIG. 8 shows the structure of the angular velocity sensor of the fourth embodiment in a section along line VIII–VIII' in FIG. 7.
Figure 9A:
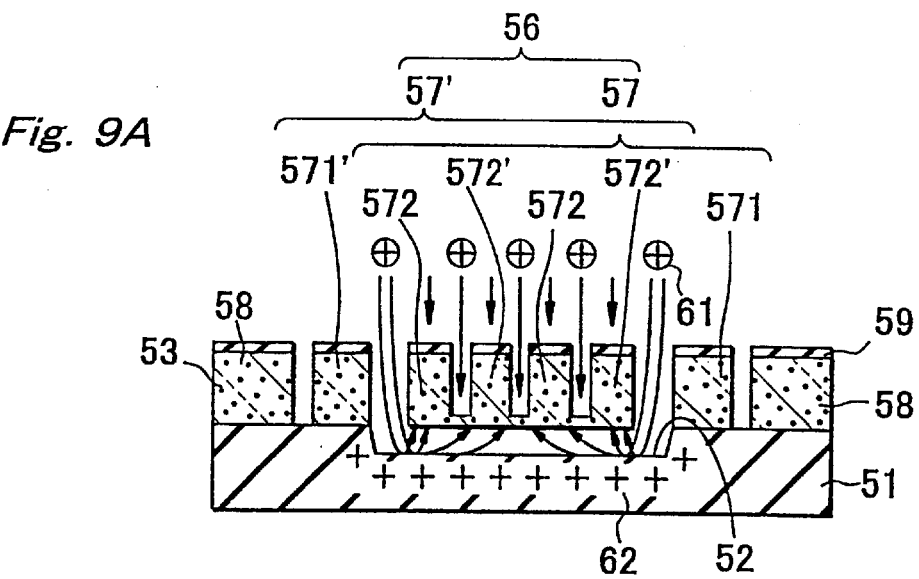
FIG. 9A and FIG. 9B are drawings (part 1) showing the operation principle of the present invention.
Figure 9B:
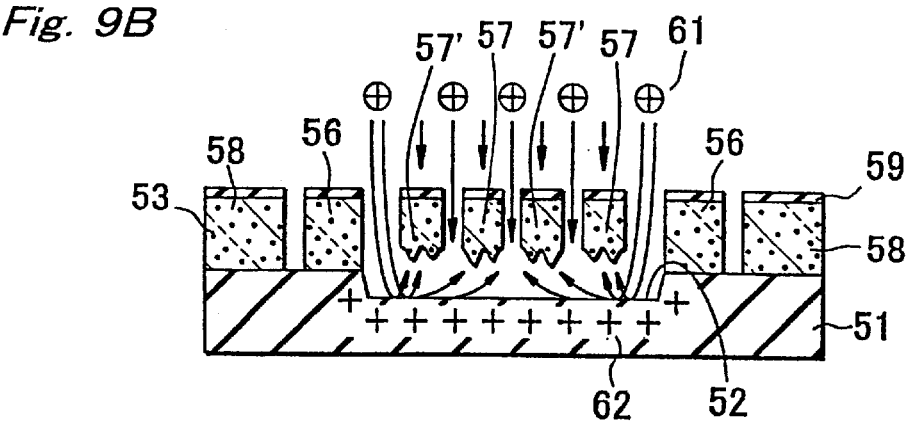
Figure 10A:
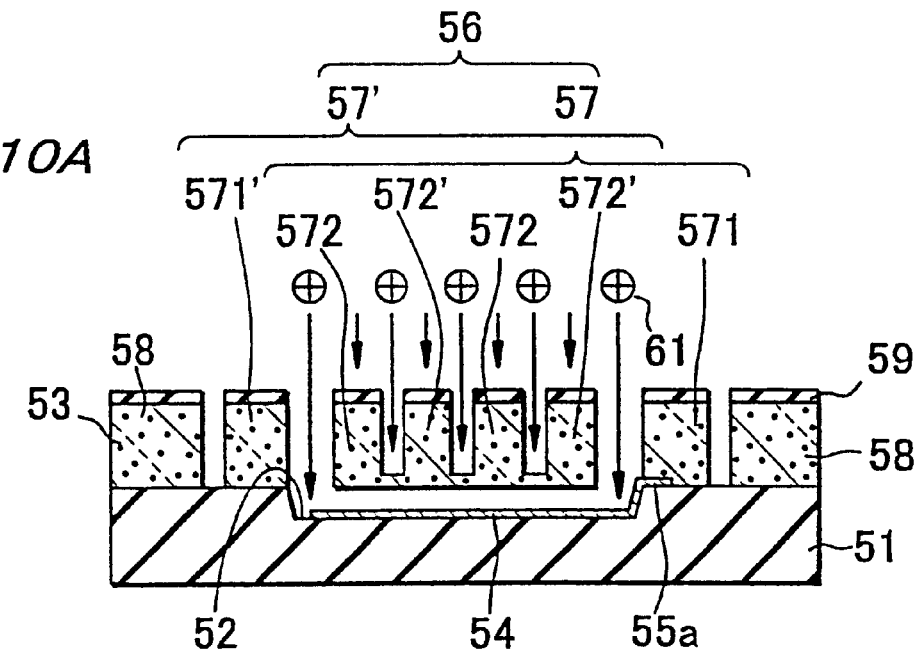
FIG. 10A and FIG. 10B are drawings (part 2) showing the operation principle of the present invention.
Figure 10B:
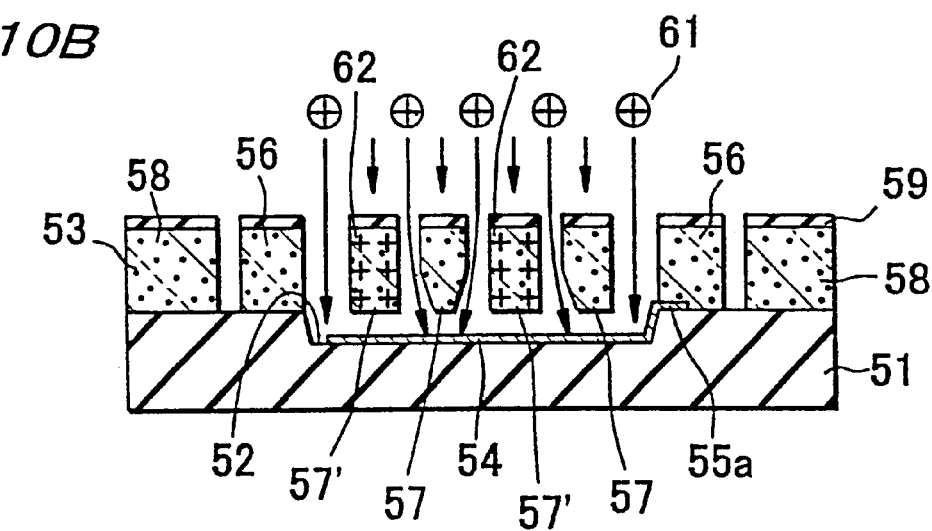
Figure 11A:
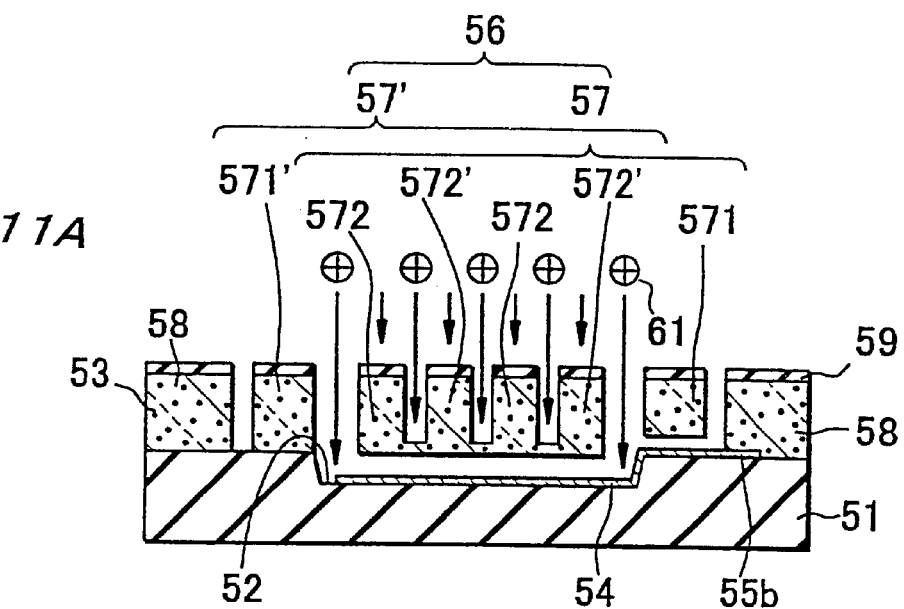
FIG. 11A and FIG. 11B are drawings (part 3) showing the operation principle of the present invention.
Figure 11B:
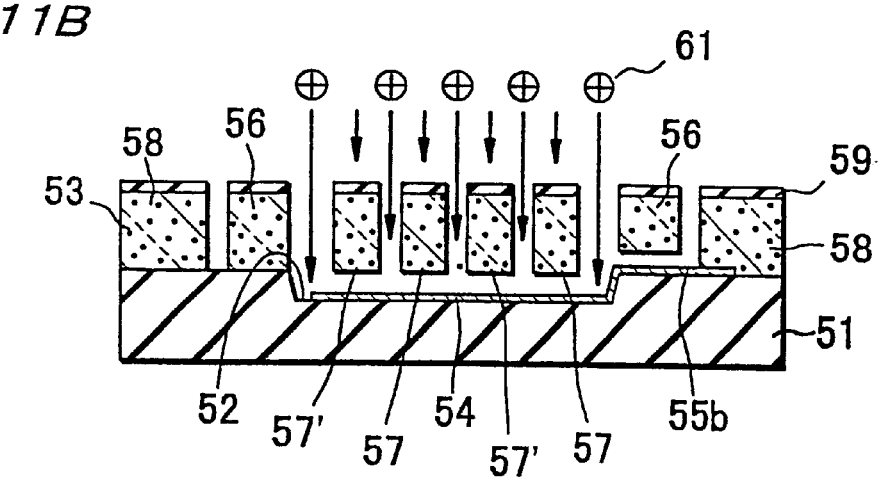
Figure 12:
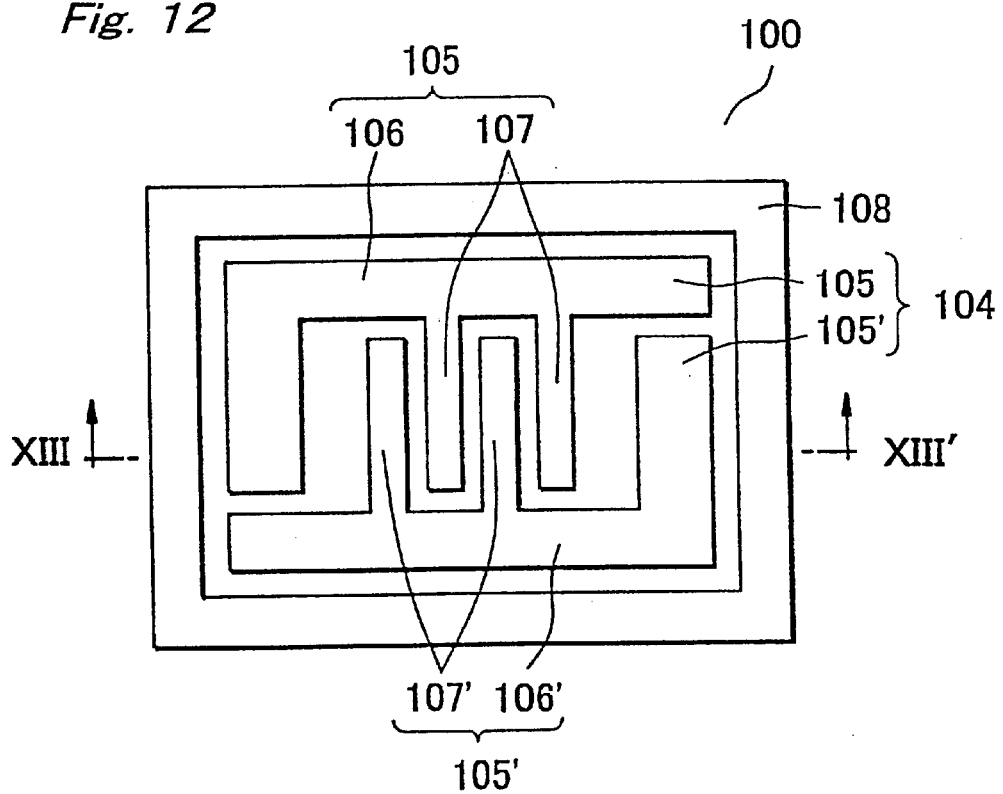
FIG. 12 shows the structure of the silicon device of the prior art, in a plan view of the beam-like structure having the basic structure.

As an example of the silicon device of the present invention, an application thereof to angular velocity sensor will be described below FIG. 7 is an exploded perspective view showing the structure of an angular velocity sensor, and FIG. 8 is a sectional view along line VIII–VIII' in FIG. 7;

The angular velocity sensor 70 includes a beam-like structure made of silicon 71, a frame 74 that surrounds the beam-like structure 71 with a space kept therefrom, a lower glass substrate 72 having a recess 73 formed on the surface, and an upper glass substrate (not shown) having a recess formed on the surface.

The beam-like structure made of silicon 71 further has two measuring section 90 each including a fixed electrode 86 that is bonded onto the lower glass substrate 72 and a movable electrode 85 disposed at around thereof. The two measuring section 90 are disposed symmetrically on both sides of a first elastic linking member 81 that links the two movable electrode 85.

The fixed electrode 86 constitutes a double-sided comb-shaped electrode that includes a base portion 87 and a plurality of cantilevers 88 disposed at predetermined distance on both longitudinal edges of the base portion 87. The movable electrode 85 includes two single-sided comb-shaped electrodes 75 that consists of a base portion 76 and a plurality of cantilevers 77, a vibration frame 80 that supports the two comb-shaped electrodes 75 via a beam 79, the first elastic linking member 81 and a second elastic linking member 78 that link the vibration frame 80 with the frame 74 so as to be capable of vibrating, while these components are all formed integrally. The two comb-shaped electrodes 75 are disposed so that the respective cantilevers 77 thereof oppose each other at the tips thereof. The cantilevers 77 of the two comb-shaped electrodes 75 are further disposed at predetermined distance on both longitudinal edges of the base portion 76 so as to oppose the cantilevers 88 of the fixed electrode 86 via a minute clearance.

An electrically conductive film 84 is formed on the surface of the recess 73 of the lower glass substrate 72 and an electrical lead 65 extending around the recess 37 is bonded to the frame 74.

Now the operating principle of the angular velocity sensor will be described with reference to the coordinate system shown in FIG. 7. With a magnetic field applied in the Z axis direction, a specified current is caused to flow through an oscillating metal wire 66 formed on the surface of the first elastic linking member 81. This generates Lorentz force in X-axis direction causing movable electrode 85 to vibrate in X axis direction. If an angular velocity is generated around the Z-axis under this condition, Coriolis' force that is proportional to the angular velocity is generated in Y-axis direction. The Coriolis' force is detected as a change in the electrostatic capacity between the cantilevers of the movable electrode 85 and the cantilevers of the fixed electrode 86. The metal wiring 67 formed on the surface of the second elastic linking member 78 is provided for the purpose of controlling the current flowing in the metal wiring 66 while constantly monitoring the vibration of the movable electrode 85. Two sets of the movable electrodes 85, 85 are provided in symmetrical arrangement with regard to the first elastic linkage member 81, so as to vibrate with reverse phases to each other. Changes in the electrostatic capacity in the movable electrodes 85, 85 are detected in differential sensing system so as to improve the linearity of the output. The metal electrode 68 formed on the frame 74 surface is a grounding electrode provided for stabilizing the parasitic capacitance.

The angular velocity sensor of this embodiment has the electrically conductive film that is formed on the surface of the recess of the insulating substrate and has electrical continuity with the frame, thus making it possible to prevent the insulating substrate from being charged during dry etching. Since this constitution prevents erosion of the comb-shaped electrode and the supporting section, the beam-like structure can be formed with high precision in the shape and dimensions, thus providing the angular velocity sensor having high reliability with less deterioration in sensitivity and less variability among sensors.

As described above, as the silicon device of the present invention device includes the insulating substrate having the recess formed on the surface thereof, the beam-like structure made of silicon formed on the front surface of the insulating substrate to surround the recess, and the frame made of silicon that surrounds the beam-like structure with a space kept therefrom and is bonded onto the insulating substrate, with the silicon device having at least one functional section in which the beam-like structure includes a supporting section bonded onto the insulating substrate and at least one cantilever that is formed integrally with the supporting section and overhangs into the clearance region. Since the silicon device has the electrically conductive film, which is electrically connected with the frame and is formed on the surface of the insulating substrate right under the cantilever, the insulating substrate can be prevented from being charged thereby significantly suppressing the damage caused on the beam-like structure during dry etching. Thus it is made possible to provide a silicon device having high reliability and high degree of freedom in design, such as acceleration sensor or angular velocity sensor used in vehicle attitude control for automobiles or collision detection for air-bag system.

By making the volumes of the functional sections that constitute the beam-like silicon structure substantially the same, volume charge density of the functional section can be made lower even when over etching is carried out for a longer period of time. This further suppresses the damage caused on the beam-like structure during dry etching.

Since the silicon device of the present invention has the electrically conductive film, which is electrically connected with the supporting section of the functional section that has the largest volume among the functional sections constituting the beam-like silicon structure, being formed on the surface of the insulating substrate right under the cantilever, volume charge density of the functional section due to positive charging can be minimized even when the functional section is charged. Thus it is made possible to provide a silicon device having even higher reliability and high degree of freedom in device structure design.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be constructed as being included therein.

What is claimed is:

1. A silicon device comprising:
   an insulating substrate having a surface including a recess,
   a beam-like structure made of silicon, on the front surface of the insulating substrate, and surrounding the recess, the beam-like structure comprising at least one functional section having a supporting section bonded to the insulating substrate and at least one cantilever integral with the supporting section and extending across the recess;
   a frame made of silicon surrounding and spaced from the beam-like structure and on the insulating substrate; and
   a conductive film having electrical continuity with the frame and on the surface of the insulating substrate, at least directly opposite the cantilever.

2. The silicon device according to claim 1, wherein the beam-like structure comprises at least two functional sections that are electrically insulated from each other and have substantially identical volumes.

3. The silicon device according to claim 2, wherein the silicon device is an acceleration sensor and the functional sections are a movable electrode and a fixed electrode.

4. The silicon according to claim 3, wherein the movable electrode and the fixed electrode have substantially identical volumes.

5. The silicon device according to claim 2, wherein the silicon device is an angular velocity sensor and the functional sections are a movable electrode and a fixed electrode, each of the movable and fixed electrodes having a comb-shaped electrode including a plurality of cantilevers extending across the recess, the movable electrode being supported on the frame for vibrating generally parallel to the surface of the insulating substrate, and the fixed electrode being bonded to the insulating substrate, the cantilevers of the movable electrode and the fixed electrode opposing each other across a gap.

6. A silicon device comprising:
   an insulating substrate having a surface including a recess,
   a beam-like structure made of silicon, on the front surface of the insulating substrate, and surrounding the recess, the beam-like structure comprising at least one functional section having a supporting section bonded to the insulating substrate and, at least one cantilever integral with the supporting section and extending across the recess, said beam-like silicon structure comprising at least two functional structures that are electrically insulated from each other and have different volumes;
   a frame made of silicon, surrounding and spaced from the beam-like structure and on the insulating substrate; and
   a conductive film having electrical continuity with the supporting section of the functional structure having the larger volume, and on the surface of the insulating substrate, at least directly opposite the cantilever.

7. The silicon device according to claim 6, wherein the silicon device is an acceleration sensor and the functional structures are a movable electrode and a fixed electrode.

* * * * *